United States Patent
Paquet

(10) Patent No.: US 10,030,684 B2
(45) Date of Patent: Jul. 24, 2018

(54) DEVICE FOR FASTENING AN OBJECT ON A SUPPORT PLATE AND OBTAINED ASSEMBLY

(71) Applicant: A.RAYMOND ET CIE, Grenoble (FR)

(72) Inventor: Jerome Paquet, Treffort (FR)

(73) Assignee: A. RAYMOND ET CIE, Grenoble (FR)

( * ) Notice: Subject to any disclaimer, the term of this patent is extended or adjusted under 35 U.S.C. 154(b) by 315 days.

(21) Appl. No.: 15/022,621

(22) PCT Filed: Aug. 26, 2014

(86) PCT No.: PCT/FR2014/052125
§ 371 (c)(1),
(2) Date: Mar. 17, 2016

(87) PCT Pub. No.: WO2015/044548
PCT Pub. Date: Apr. 2, 2015

(65) Prior Publication Data
US 2016/0356298 A1   Dec. 8, 2016

(30) Foreign Application Priority Data
Sep. 24, 2013 (FR) .................................. 13 59153

(51) Int. Cl.
| F16B 21/06 | (2006.01) |
| E05C 19/02 | (2006.01) |
| E05C 19/06 | (2006.01) |

(52) U.S. Cl.
CPC .......... *F16B 21/065* (2013.01); *E05C 19/022* (2013.01); *E05C 19/06* (2013.01)

(58) Field of Classification Search
CPC .... F16B 21/065; F16B 21/075; F16B 5/0614; F16B 5/0657; F16B 5/0607; F16B 5/065; F16B 5/0642
See application file for complete search history.

(56) References Cited

U.S. PATENT DOCUMENTS

| 4,865,505 A * | 9/1989 | Okada ..................... B60N 3/046 |
| | | 24/293 |
| 9,488,202 B2 * | 11/2016 | Komeno ............. B60R 13/0206 |

(Continued)

FOREIGN PATENT DOCUMENTS

| DE | 102005052736 A1 | 5/2007 |
| FR |     2852996 A1 | 10/2004 |
| WO |   2013022907 A1 | 2/2013 |

OTHER PUBLICATIONS

Chinese Office Action regarding Application No. 2014800526655.
(Continued)

*Primary Examiner* — Daniel J Wiley
(74) *Attorney, Agent, or Firm* — Dickinson Wright PLLC

(57) ABSTRACT

A fastener device for fastening an article on a support plate, and the resulting assembly, which fastener device comprises: a hollow body that is secured to the support plate; a slider that is secured to the article and that is suitable for being engaged in the hollow body; and blocking means.

The blocking means comprise both at least one side opening that passes through the hollow body and also an elastically-deformable blocking tab that is carried by the slider and that, during engagement of the slider in the hollow body, is for deploying sideways into the side opening and for bearing simultaneously beneath the support plate so as to oppose any longitudinal removal of the slider, and against the slider so as to oppose any longitudinal thrust of the slider, and thus define a first blocking position.

14 Claims, 4 Drawing Sheets

(56) References Cited

U.S. PATENT DOCUMENTS

| | | | |
|---|---|---|---|
| 2005/0155191 A1* | 7/2005 | Asano | B60R 13/0206 24/297 |
| 2007/0120380 A1 | 5/2007 | Bella | |
| 2007/0189875 A1* | 8/2007 | Ooyama | F16B 5/065 411/45 |
| 2012/0240363 A1* | 9/2012 | Lee | B60R 13/0206 24/297 |
| 2014/0363224 A1* | 12/2014 | Iwahara | B60R 13/0206 403/326 |
| 2015/0321622 A1* | 11/2015 | Dickinson | B60R 13/0206 24/458 |
| 2016/0214520 A1* | 7/2016 | Kajio | B60N 3/023 |

OTHER PUBLICATIONS

Chinese Office Action regarding Application No. 2014800526655 dated Feb. 28, 2017 with English translation.
International Search Report dated Dec. 5, 2014.

* cited by examiner

DEVICE FOR FASTENING AN OBJECT ON A SUPPORT PLATE AND OBTAINED ASSEMBLY

CROSS-REFERENCE TO RELATED APPLICATION

This application is a 371 national phase entry of PCT/FR2014/052125, filed 26 Aug. 2014, which claims benefit of French Patent Application No. 1359153, filed 24 Sep. 2013, the entire contents of which are incorporated herein by reference for all purposes.

BACKGROUND

1. Technical Field

The invention generally relates to a fastener device for fastening an article on a support plate, e.g. for fastening an article in the passenger compartment of a motor vehicle. The invention also relates to an assembly obtained with such a fastener device.

2. Related Art

That type of fastener device should guarantee effective anchoring, in particular making it possible to withstand a head-on impact so as to avoid the article and/or the fastener device transforming into a projectile. In order to allow for maintenance, the fastener device should also be easy to undo.

Publication FR 2 852 996 describes such a fastener device comprising a hollow body that is suitable for being secured to a support plate, and a slider that is suitable for being secured to the article to be fastened and housed in the hollow body. The hollow body and the slider are provided with blocking means that are suitable for longitudinally blocking the slider in the hollow body after a first longitudinal thrust, forcing the slider into engagement in the hollow body, and that are suitable for unblocking the slider from the hollow body after a second longitudinal thrust on the slider. The fastener device includes a spring that is provided between the hollow body and the slider, and that urges the slider longitudinally towards the outside of the hollow body. The blocking means include a flexible tab that is suitable for deforming sideways, which flexible tab is formed by the hollow body and has an end that is provided with a cam finger. The blocking means also include a cam that is carried by the slider and that is suitable for guiding the cam finger. To this end, the cam includes a central island having a periphery that forms a cam path that guides the cam finger. The central island includes a setback that defines a blocking position in which said cam finger prevents the slider being removed longitudinally from the hollow body. Thus, the slider is blocked in the hollow body by a first longitudinal thrust of the slider into the hollow body, during which the flexible tab is deformed by the cam finger that follows the cam path. When the cam finger reaches the setback, the flexible tab relaxes. The spring urges the slider in the direction of its removal until the cam finger is blocked in its blocking position in the setback of the cam. The article is thus secured to the support plate. Unblocking the slider is obtained by applying a second longitudinal thrust on the slider, during which the cam finger moves longitudinally away from the setback until it reaches a portion in relief that deforms the flexible tab sideways, offsetting the cam finger sideways from the setback. In order to be able to house the cam finger in the setback, then in order to apply the second longitudinal thrust, the article must necessarily not already be flattened against the support wall. Thus, when the slider is in its blocking position, longitudinal functional clearance exists between the article and the support plate, allowing a subsequent longitudinal thrust. After the second longitudinal thrust, while it relaxes the spring causes the slider to be removed from the hollow body, the cam finger then travels freely over the side edge of the central island. The slider is then free to be extracted from the hollow body, the article is thus separated from the support plate.

U.S. publication No. 2008/0 211 249 describes a substantially-similar fastener device in which the slider further includes flexible jaws for moving towards each other when the slider is engaged in the hollow body, so as to clamp the article that is to be fastened to the support plate between them.

Such fastener devices present several major drawbacks. Firstly, they require a large number of parts and they are complex to manufacture. They are tricky to assemble, it being necessary to hold the spring in place in the hollow body before the slider is engaged and at the start of its engagement. Secondly, each of such fastener devices requires longitudinal functional clearance to exist between the article and the support plate once locking has occurred. If such longitudinal functional clearance does not exist, unlocking cannot be obtained without breaking one or more of the parts of the fastener device. As a result of the longitudinal functional clearance, the article may inadvertently be moved closer to the plate and may cause the slider to be unlocked accidentally. Furthermore, longitudinal functional clearance can give a user the feeling that the fastening is not secure since the user observes that the article can move, e.g. when it is subjected to vibration associated with variations in speed and unevenness in the road. In addition, in the event of impact, the fastening is of the "all-or-nothing" type, i.e. either the elements (in particular the flexible tab) withstand the tearing force and the article remains secured to the support plate, or one of the elements breaks and the article is free to move relative to the support plate. Finally, such devices do not make it possible to reveal a failed attempt at tearing out that has not resulted in separating the article, but that might have weakened the mechanical strength of the parts.

Publication DE 10 2005 052736 describes a pusher device for opening and closing the cover of a storage compartment for storing articles.

SUMMARY OF THE INVENTION

The object of the invention is to remedy those drawbacks by proposing: a fastener device for fastening an article on a support plate, which fastener device is easy to manufacture, to assemble, and to use, guaranteeing fastening that is safe, reliable, and releasable, without longitudinal functional clearance, making it possible, in the event of an impact, for the article to not be completely separated from the support plate and for any attempt at tearing out to be revealed; and a resulting assembly.

To this end, one aspect of the invention provides a fastener device for fastening an article on a support plate, which fastener device comprises: a hollow body that is for housing in an engagement opening of the support plate, and that is provided with anchor means that are suitable for securing it to the support plate; a slider that is suitable for successively being engaged in and extracted from the hollow body, and that is provided with attachment means that are suitable for securing it to the article; and blocking means that are arranged:

on application of a first longitudinal thrust on the slider, initially to allow the slider to be engaged longitudinally in the hollow body, and subsequently tending to hold the slider blocked longitudinally relative to the hollow body in a first blocking position in which it cannot be engaged longitudinally beyond the first blocking position; and on application of a first longitudinal removal force on the slider following the first longitudinal thrust, to retract in part and initially unblock the slider from the first blocking position and allow it to be removed in part from the hollow body, and, starting from the first blocking position, subsequently block the slider longitudinally in a second blocking position that is longitudinally offset from the first position and in which it cannot be removed from the hollow body and cannot be engaged longitudinally beyond the second blocking position;

the fastener device being characterized in that the blocking means comprise both at least one side opening that passes through the hollow body and also an elastically-deformable blocking tab that is carried by the slider and that, during engagement of the slider in the hollow body, is for deploying sideways into the side opening and for bearing simultaneously beneath the support plate so as to oppose any longitudinal removal of the slider, and against the slider so as to oppose any longitudinal thrust of the slider, and thus define said first blocking position.

The basic idea of the invention is to provide two fastener systems that make it possible, firstly, after the first longitudinal thrust, to fasten the slider flat against the hollow body, thus eliminating any functional clearance and preventing any additional longitudinal engagement; and secondly, after the slider has been removed in part, to hold the slider connected to the hollow body so as to avoid the article unfastening completely. Furthermore, the impact is revealed by the slider being removed in part from the hollow body. It is thus possible to know that the fastener device has been subjected to an impact, and to intervene accordingly.

The fastener device of the invention may advantageously present the following features:

said blocking means are arranged:
  on application of a second longitudinal thrust on the slider following the first longitudinal removal force, to retract in part and block the slider longitudinally relative to the hollow body in the first blocking position; and
  on application of a second longitudinal removal force on the slider following the second longitudinal thrust, to retract completely so as to unblock the slider from the first position and allow it to be removed completely from the hollow body;

the blocking means comprise a flexible tab provided at least with a cam finger and a cam, one of which is carried by the slider and the other by the hollow body, the cam including a central island that defines a guide path suitable for guiding the cam finger, and that is provided with an engagement portion for guiding the cam finger towards its first blocking position while the slider is being engaged in the hollow body, a disengagement portion for acting, while the slider is being removed, to guide the cam finger relative to the hollow body after the second blocking position, and a setback that separates the engagement and disengagement portions, and that is for receiving the cam finger and for defining the second blocking position;

the cam includes a stop lug that is longitudinally offset from the central island and that is provided longitudinally facing the setback, and the slider is arranged so that, in the first blocking position, the cam finger is longitudinally facing the stop lug and is flattened by the flexible tab against the stop lug that prevents it from passing from the engagement portion to the disengagement portion, thereby defining a standby position for the cam finger;

the central island includes a flexible finger that is arranged to prevent the cam finger from being inserted into the disengagement portion while the slider is being engaged in the hollow body, and to allow the cam finger to leave the disengagement portion while the slider is being removed from the hollow body;

the flexible tab is carried by the slider, and the cam is carried by the hollow body;

the slider includes two flexible jaws that cooperate with each other to define a longitudinal recess for receiving the article and for blocking it between them by clamping, so as to form the attachment means;

the hollow body includes at least one platform that extends sideways and that is for coming to bear against the support plate, and a flexible hook that is flexible sideways and that is suitable for retracting while the hollow body is passing into the engagement opening, and for deploying beneath the support plate when the platform bears against the support plate so as to block the support plate between the platform and the flexible hook and so as to form the anchor means;

the flexible tab presents an upsidedown T-shape, the width of the stem of the T-shape is less than the width of the jaws, the bar of the T-shape forms a cam finger on either side of the stem of the T-shape, and the hollow body includes two cams that are provided on either side of a mid-plane of the hollow body, symmetrically to each other about the mid-plane and each for receiving one of the cam fingers;

the slider is formed by folded sheet metal, each jaw presents an upsidedown U-shape, the ends of the facing inside branches of the jaws being interconnected via a base so as to co-operate with each other to define a U-shape that defines the longitudinal recess, and an outside branch of one of the jaws opposite to the other jaw is extended longitudinally by a plane portion forming the flexible tab;

each free end of each outside branch of the upsidedown U-shape of each jaw includes a flap that is folded back towards the corresponding inside branch of the upsidedown U-shape, each free end of each inside branch of said upsidedown U-shape of each jaw includes a notch that houses the corresponding flap and that is arranged in such a manner that, while the slider is being subjected to the first or second longitudinal removal force, it receives thrust from the flap, so as to prevent the outside branches from unfolding relative to the inside branches;

the slider includes at least one blocking strip that extends from the base defining the longitudinal recess, and that is arranged in such a manner that, while the slider is being subjected to the first or second longitudinal removal force, it bears against the free ends of the outside branches, so as to prevent the inside branches from unfolding relative to the outside branches; and the hollow body comprises first and second body portions that are designed to be mounted on each other and to be taken apart.

The invention also provides an assembly of an article on a support plate that is provided with an engagement opening, the assembly being characterized in that it comprises a fastener device as described, the hollow body being housed in the engagement opening and secured to the support plate by the anchor means, the article being secured to the slider by the attachment means.

BRIEF DESCRIPTION OF THE DRAWINGS

The present invention can be better understood and other advantages appear on reading the detailed description of an embodiment given by way of non-limiting example and shown in the accompanying drawings, in which.

DESCRIPTION OF THE EXAMPLE EMBODIMENTS

The fastener device of the invention is for fastening an article on a support, e.g. a support plate or any other similar type of support. By way of example, the fastener device thus enables an article to be fastened inside the passenger compartment of a motor vehicle, or enables any other type of fastening.

Figure 1:
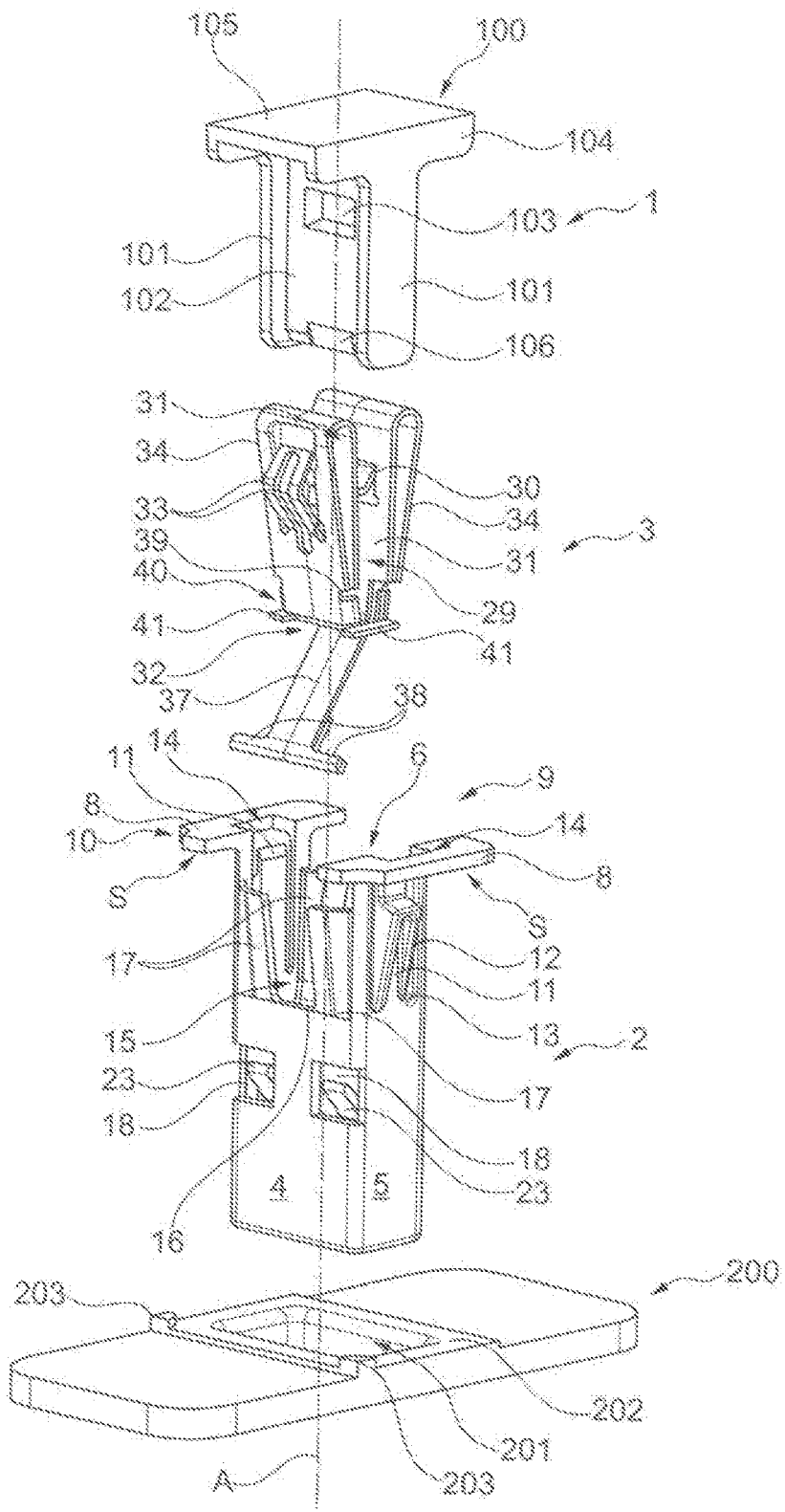
FIG. 1 is an exploded perspective view of the fastener device of an embodiment the invention.

In the embodiment shown in particular in FIG. 1, the fastener device 1 is used to fasten an article 100 on a support plate 200. In this embodiment, the article 100 presents a double-T shape having stems 101 that are interconnected via a central slab 102 through which a slot 103 passes, and having branches 104 that are interconnected via a transverse slab 105 that co-operates with the branches 104 to form a head. The free end of the central slab 102 includes a beveled shape 106 for making it easier to fasten the article 100. By way of example, the article 100 is an intermediate part that is used to fasten another element (not shown). The support plate 200 includes an engagement opening 201, e.g. of rectangular shape, defined by a bead 202 provided with two indicator lugs 203 for indicating the mounting direction.

With reference to FIG. 1, the fastener device 1 includes a hollow body 2 and a slider 3 for co-operating with each other and with the support plate 200 and the article 100 so as to secure said article to the support plate 200.

Figures 2, 3:
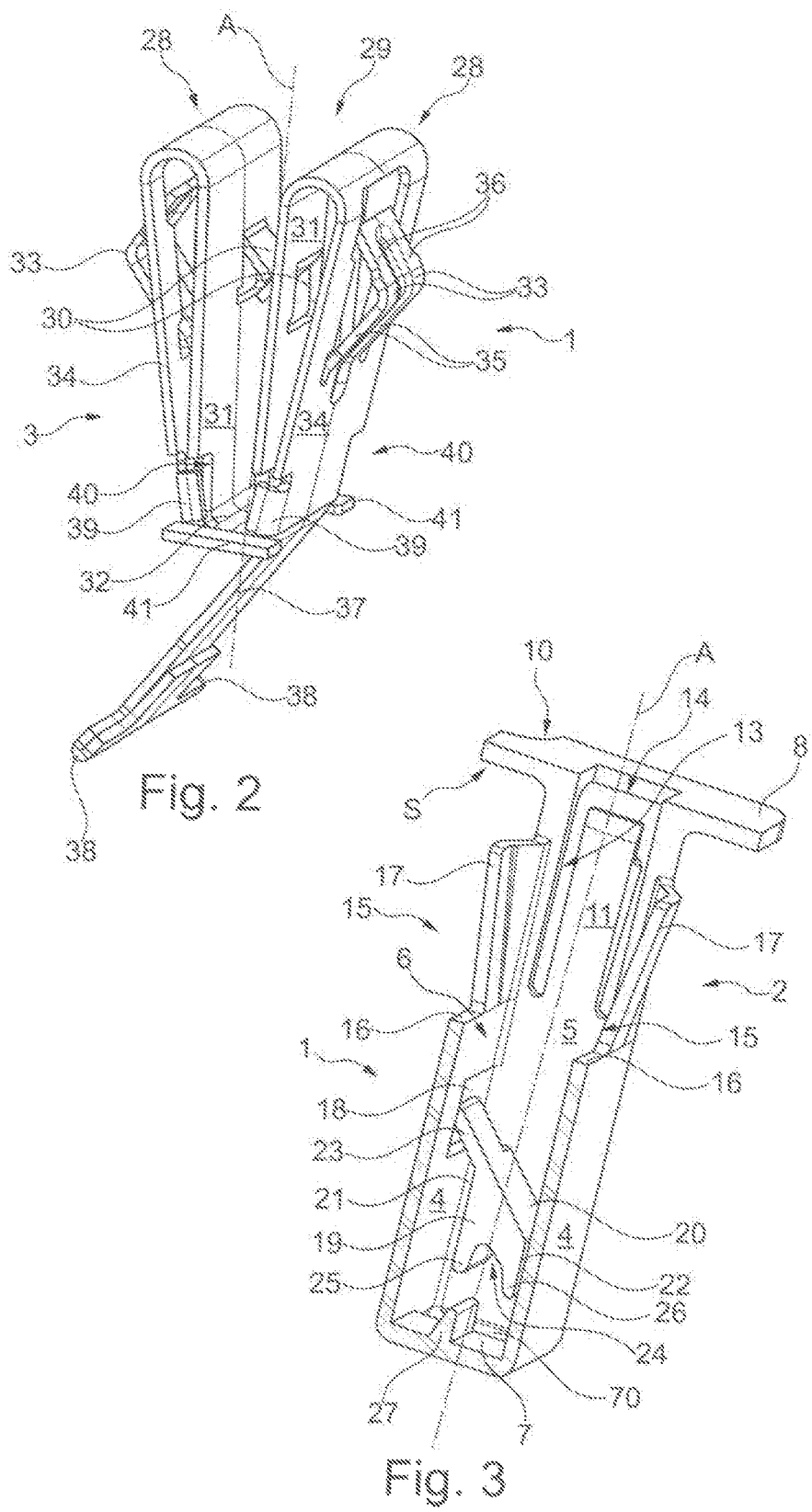
FIG. 2 is a view in perspective, showing the FIG. 1 fastener device.
FIG. 3 is a perspective and section view on a longitudinal mid-plane of the slider of the hollow body of the FIG. 1 fastener device.

The hollow body 2 shown in detail in FIG. 3 is for inserting longitudinally into the engagement opening 201 of the support plate 200. The hollow body 2 extends longitudinally along the longitudinal axis A and presents a cross-section that is substantially parallelepipedic, the body being defined by two facing side walls 4 and by two facing transverse walls 5 that are connected together and that co-operate with one another to define a housing 6 for receiving the slider 3 described below. The parallelepipedic section of the hollow body 2 matches the shape of the engagement opening 201 in the support plate 200. Thus, the hollow body 2 may present any other section that matches an engagement opening 201 of some other shape. An end of the hollow body 2 is closed by a bottom tab 7 that interconnects the side walls 4, cooperating with the transverse walls 5 to form two bottom openings 70 (of which only one can be seen), allowing the housing 6 to be accessed on either side of the bottom tab 7. The bottom openings 70 are used while manufacturing the fastener device 1, in particular for the cam described below. The other end of the hollow body 2 is open and is provided with two platforms 8, each carried by a respective one of the transverse walls 5, and extending perpendicularly to the longitudinal axis A so as to form a bearing surface S for bearing against the bead 202 of the support plate 200. The platforms 8 are separated from each other by an engagement slot 9 (as can be seen in FIG. 1) for receiving the head of the article 100 while fastening it on the support plate 200. A side end of each platform 8 includes an indented shape 10 that is complementary to its corresponding lug 203 provided on the support plate 200, the other end includes a projecting shape that is symmetrical about the longitudinal axis A to the indented shape 10. Thus, the hollow body 2 can be engaged in the engagement opening 201 of the support plate 200 in only one predetermined direction.

Each transverse wall 5 further includes a flexible hook 11 that projects outwards from the hollow body 2 and that is suitable for elastically deforming sideways while the hollow body 2 is being inserted into the engagement opening 201. Each of the flexible hooks 11 is formed by a spline 12 in the shape of an upsidedown U (as can be seen in FIG. 1), which spline extends transversally from the transverse wall 5 and has edges that slope so that their height relative to the transverse wall 5 at the free ends of the U-shape is less than their height at the base of the U-shape. Each transverse wall 5 includes a cut-out 13 in the shape of an upsidedown U, imparting flexibility to the flexible hook 11 that carries the spline 12. Each platform 8 includes a step 14 that is provided longitudinally in register with the corresponding flexible hook 11, making it possible to access the flexible hooks 11 via the inside of the hollow body 2, e.g. for removing the hollow body 2 from the support plate 200 by causing the flexible hooks 11 to flex.

Each side wall 4 has a side opening 15 that passes therethrough and that opens out into the engagement slot 9. The side opening 15 is defined longitudinally by a bearing edge 16 that is remote from the engagement slot 9, and transversally by webs 17 that project outwards from the hollow body 2 and that slope so as to get closer to the longitudinal axis A on going away from the platforms 8. One of the side walls 4 includes two cam openings 18 that are in alignment longitudinally, that are provided between the bearing edge 16 and the bottom tab 7, and that have a function that is described below.

Each transverse wall 5 carries a cam that is formed by a central island 19 that is provided without contact between the transverse walls 4 so as to define a peripheral guide path. The central island 19 includes a sloping panel 20 that faces towards the platforms 8 and that slopes in such a manner that the distance between it and the platforms 8 increases progressively on going away from the side face 4 that includes the cam openings 18 towards the other side face 4 that does not include any cam opening. On either side of the sloping panel 20, the central island 19 includes two longitudinal panels 21, 22 that define an engagement portion of the guide path and a disengagement portion of the guide path. The central island 19 carries a flexible finger 23 that is provided at the tip of the central island 19 between the engagement portion defined by the longitudinal panel 21 and the sloping panel 20. The flexible finger 23 is not in contact with the corresponding transverse wall 5, and it extends in alignment with the sloping panel 20 until it passes through the cam opening 18. Thus, the flexible finger 23 interposes any longitudinal insertion into the disengagement portion coming from the platforms 8. The flexible finger 23 may deform when it is subjected to stress forces. Remote from the sloping panel 20, the central island 19 includes a setback 24 that is separated from the engagement portion by an engagement nose 25 that projects longitudinally relative to the setback 24, and that is separated from the disengagement portion by a disengagement nose 26 that also projects longitudinally relative to the setback 24. The setback 24 presents a slope that is substantially similar to the slope of the sloping panel 20. The cam comprises a stop lug 27 that is carried by the bottom tab 7 and that is oriented longitudinally towards the setback 24. The stop lug 27 includes a stop face that is substantially parallel to the longitudinal axis A.

The cams are symmetrical to each other about a mid-plane that includes the longitudinal axis A and the centers of the side openings 15.

The slider 3 shown in detail in FIG. 2 is for securing to the article 100 and for engaging longitudinally in the housing 6 of the hollow body 2. The slider 3 includes deformable jaws 28 that face each other and that co-operate with each other to define a longitudinal recess 29 for receiving the article 100 and for blocking it.

The jaws 28 are arranged so that while the slider 3 is being engaged longitudinally in the hollow body 2, they move towards each other and reduce the width of the longitudinal recess 29 so as to clamp the article 100. Furthermore, each jaw 28 includes a tooth 30 that is oriented towards the opposite jaw 28 and that is for housing in the slot 103 of the article 100 while the corresponding jaw 28 is deforming. Advantageously, the teeth 30 are provided staggered sideways, so as not to interfere with each other while moving closer together. The width of the slot 103 is designed to receive the two teeth 30 side by side.

The slider 3 is formed by folded sheet metal. Thus, each jaw 28 is formed by folding a portion of the sheet metal into an upsidedown U-shape. The facing ends of the inside branches 31 of the upsidedown U-shape are interconnected via a base 32 in such a manner that the jaws 28 co-operate with each other to define a U-shape. Thus, the inside branches 31 define the longitudinal recess 29 and they carry the teeth 30 that are formed by cutting and folding the sheet metal.

Each jaw 28 includes a pair of elastically-deformable blocking tabs 33 that are carried by the outside branches 34 of the upsidedown U-shape. Each blocking tab 33 presents a V-shape having a point that is oriented sideways away from the longitudinal recess 29 in such a manner as to define a first panel 35 that is oriented towards the base of the slider 3, and a second panel 36 that is oriented away from the base of the slider 3. Each pair of blocking tabs 33 is formed by cutting and folding the sheet metal, with the end of the first panel 35 remote from the point of the V-shape being secured to the outside branch 34, and the end of the second panel 36 remote from the point of the V-shape being free to move. Each blocking tab 33 is elastically-deformable such that the point of the V-shape projects to a greater or lesser extent relative to the face of the corresponding outside branch 34.

The slider 3 includes a flexible tab 37 that is formed by a plane portion that longitudinally extends the outside branch 34 of one of the jaws 28. The flexible tab 37 presents an upsidedown T-shape having a base of the stem that is secured to the corresponding jaw 28 and having a bar that is free. The free ends of the bar of the T-shape form cam fingers 38. At the free end of the flexible tab 37, the sheet metal is folded so as to increase the mechanical strength of the cam fingers 38. The width of the stem of the T-shape is less than the width of the corresponding jaw 28.

Each free end of each outside branch 34 of the jaws 28 includes a flap 39 that is folded back towards its corresponding inside branch 31. In addition, each free end of each inside branch 31 of the jaws 28 includes a notch 40 that houses the corresponding flap 39.

Finally, the slider 3 includes two blocking strips 41 that are provided on either side of the base 32 to which they are secured. The blocking strips 41 extend beyond the base 32, so as to pass under the above-described flaps 39.

Prior to fastening the article 100 on the support plate 200, the hollow body 2 is pre-assembled on the support plate 200 and the article 100 is pre-assembled on the slider 3. To do this, the hollow body 2 is inserted longitudinally into the engagement opening 201 of the support plate 200 until the platforms 8 bear against the bead 202. During insertion, the edges of the engagement opening 201 elastically deform the flexible hooks 11 towards each other. Once the flexible hooks 11 have passed over the thickness of the support plate 200, they are deployed outwards, bearing beneath the support plate 200. In this pre-assembled position, the platforms 8 bear against the support plate 200. Thus, the platforms 8 and the flexible hooks 11 jam the support plate 200 and form anchor means that secure the hollow body 2 to the support plate 200. In addition, the article 100 is inserted longitudinally into the longitudinal housing 29 of the slider 3 until the article 100 comes into abutment against the base 32 of the slider 3. In this position, the teeth 30 coincide longitudinally with the slot 103 of the article 100.

Fastening the article 100 on the support plate 200 is described below with reference to FIGS. 4 to 6. Fastening is obtained by a first longitudinal thrust represented by arrow P1 and applied on the slider 3 relative to the hollow body 2.

Figure 4:
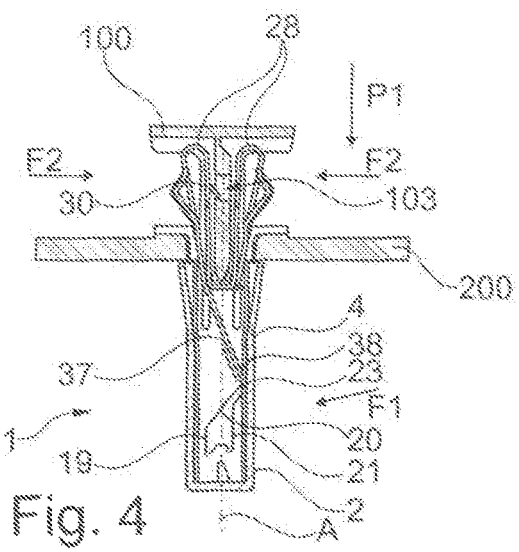
FIGS. 4 to 6 are side views in section, on a longitudinal mid-plane, of the fastener device of an embodiment of the invention, showing the fastening steps.

With reference to FIG. 4, after pre-assembly, the slider 3 carrying the article 100 is presented in register with the housing 6 of the hollow body 2 that is carried by the support plate 200 in such a manner that the indented shapes 10 face the lugs 203 longitudinally. The orientation of the cam, and in particular the position of the flexible finger 23, are thus assured. The slider 3 is then engaged longitudinally in the hollow body 2 in such a manner that the flexible tab is oriented towards the flexible finger 23. At the beginning of the longitudinal engagement, the flexible tab 37 is elastically-deformed along arrow F1 and bears against the side wall of the hollow body 2. Then, the cam fingers 38 come into contact with the flexible fingers 23 that deflect them, deforming the flexible tab 37 along the same arrow F1, thereby preventing the cam fingers 38 from engaging in the disengagement portions of the cam that are delimited by the longitudinal panels 21.

Longitudinal engagement continues. On passing through the engagement opening 201 in the support plate 200, the jaws 28 are elastically-deformed towards each other along arrows F2, the teeth 30 being inserted on either side of the article 100 into the slot 103. Thus, the article 100 is secured in the slider 3 by the teeth 30 that form the attachment means for attaching the article 100 to the hollow body 2.

Figure 5:
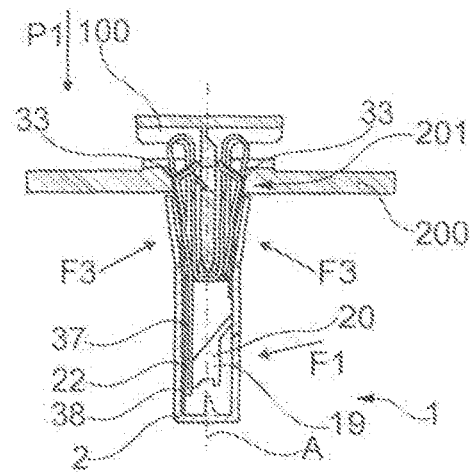

With reference to FIG. 5, longitudinal engagement continues. The blocking tabs 33 are elastically-deformed towards each other on passing through the engagement opening 201 of the support plate 200 along arrows F3. The cam fingers 38 travel along the sloping panels 20, the flexible tab 37 extending its elastic deformation along arrow F1, the cam fingers 38 then being engaged in the engagement portions defined by the longitudinal panels 22.

Figure 6:
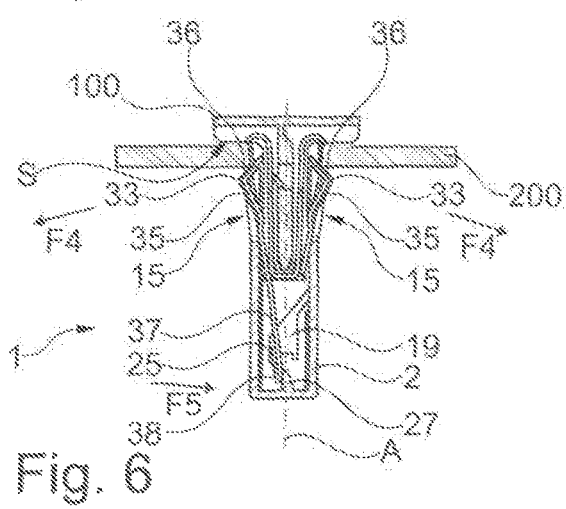

With reference to FIG. 6, after passing through the support plate 200, the blocking tabs 33 are deployed through the side openings 15 along arrows F4, bearing beneath the support plate 200 and against the slider 3. The first panels 35 of the blocking tabs 33 bear against the webs 17 of the slider 3 and urge the slider 3 to be removed longitudinally from the hollow body 2. Simultaneously, the second panels 36 of the blocking tabs 33 bear beneath the support plate 200 and urge the slider 3 in its direction of engagement. Thus, the slider 3 is stationary in a first longitudinal blocking position in which its longitudinal removal is limited by the blocking tabs 33, and continued longitudinal engagement thereof is prevented by the platforms 8 bearing against the support plate 200 and by the article 100 bearing against the support plate 200. Thus, in this first blocking position, the article 100 is secured to the support plate 200. In addition, in this first blocking position of the slider 3, the cam fingers 38 are released from the engagement portion, the flexible tab 37 tending to fold down, the cam fingers 38 going round the engagement nose 25. The flexible tab 37 comes to bear against the stop lug 27 along arrow F5. The stop lug 27 holds the cam fingers 38 in a standby position, preventing them from directly joining the disengagement portion of the cam path.

In this first blocking position, the article 100 is secured to the support plate 200 against which it is flattened, without any residual clearance. Any new longitudinal thrust is prevented.

Separating the article 100 from the support plate 200 is described below with reference to FIGS. 7 to 9. Separation requires three distinct successive steps, namely: applying, to the slider 3, a first longitudinal removal force relative to the hollow body 2, represented by arrow R1; then applying, to the slider 3, a second longitudinal thrust relative to the hollow body 2, represented by arrow P2; and finally applying, to the slider 3, a second longitudinal removal force, represented by arrow R2. The first longitudinal removal force may occur either during an impact during which the inertia of the article 100 subjects the slider 3 to a longitudinal removal force, or deliberately by traction being applied directly or indirectly on the slider 3.

Figure 7:
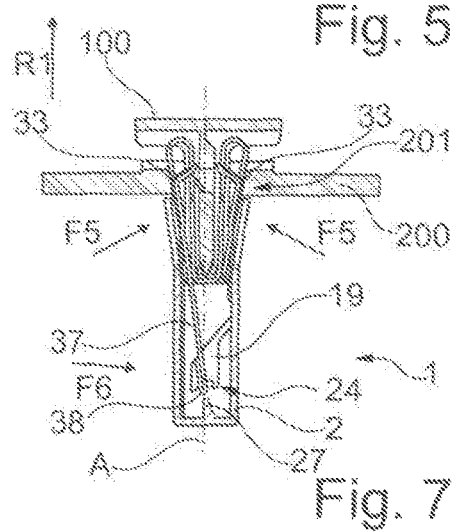
FIGS. 7 to 9 are side views in section, on a longitudinal mid-plane, of the fastener device of an embodiment of the invention, showing the separation steps.

With reference to FIG. 7, the slider 3 that is subjected to the first longitudinal removal force R1 moves longitudinally relative to the hollow body 2 through a first removal stroke during which, firstly, the blocking tabs 33 deform on passing through the engagement opening 201 of the support plate 200 so as to retract along arrows F5, and, secondly, the flexible tab 37 is disengaged longitudinally from the stop lug 27, the cam fingers 38 becoming housed in the setbacks 24 of the central islands 19 along arrow F6. Removal of the slider 3 is partial, and continued removal under the effect of a removal force is prevented by the cam fingers 38 becoming blocked in the setbacks 24, thereby defining a second longitudinal blocking position.

Figure 8:
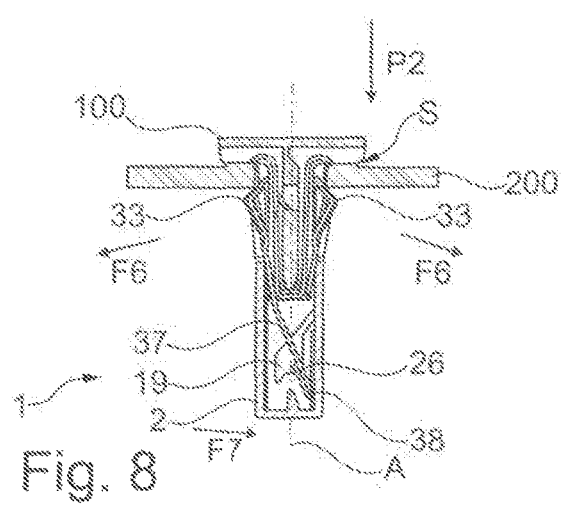
Figure 9:
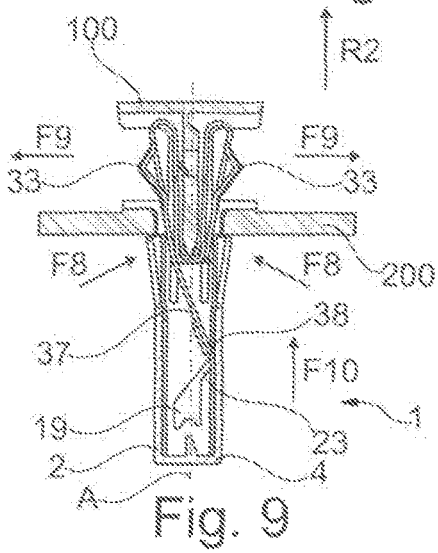

With reference to FIG. 8, in order to be able to remove the slider 3 from the hollow body 2, it is necessary to subject the slider 3 to a second longitudinal thrust relative to the hollow body 2, represented by arrow P2. During this second longitudinal thrust P2, the blocking tabs 33 redeploy beneath the bearing plate 200 along arrows F6. Since the flexible tab 37 tends to fold down, the cam fingers 38 go round the disengagement nose 26 so as to become positioned in the disengagement portion along arrow F7. The slider 3 is then no longer in its second blocking position, but is held once again in its first blocking position. The slider 3 may then be extracted, as shown in FIG. 9, by applying a second longitudinal removal force to the slider 3 and represented by arrow R2.

During removal, on passing through the engagement opening 201 of the support plate 200, the blocking tabs 33 deform so as to retract along arrows F8 before redeploying above the support plate 200 along arrows F9. The cam fingers 38 travel freely in the disengagement portion until they reach the flexible fingers 23 that they force to flex along arrow F10, before continuing to move along the side wall 4 of the hollow body 2. The slider 3 may thus be removed completely from the hollow body 2. Once the slider 3 has been extracted, the article 100 may be separated from the slider 3 by spacing apart the jaws 28, the teeth 30 thus being released from the slot 103. The hollow body 2 may be separated from the support plate 200 by inserting a tool into the step 14 and forcing the flexible hooks 11 back towards the longitudinal axis A.

After fastening, when the slider 3 is subjected to a traction force, each flap 39 of an outside branch 34 of a jaw 28 comes to bear against a sharp edge of the corresponding notch 40 and prevents the outside branches 34 from unfolding relative to the inside branches 31. In addition, each blocking strip 41 comes to bear beneath the corresponding flaps 39 and prevents the inside branches 31 from unfolding relative to the outside branches 34. The mechanical strength of the slider 3 is good.

Figure 10:
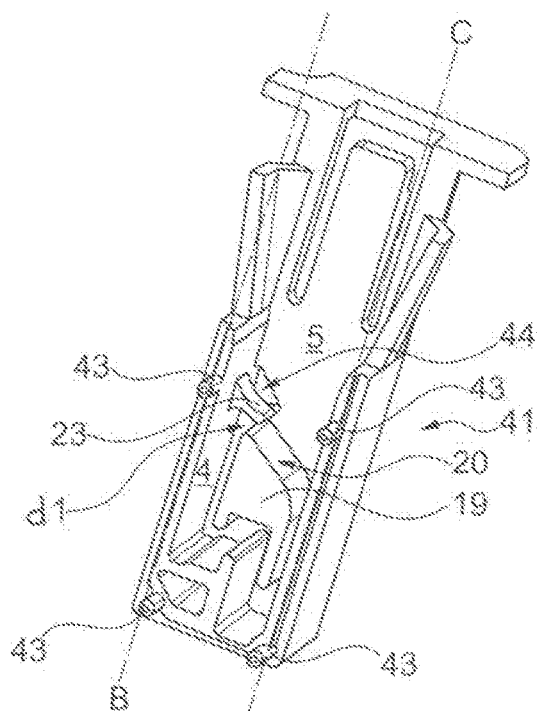
FIGS. 10 and 11 are side views in another embodiment of the invention.
Figure 11:
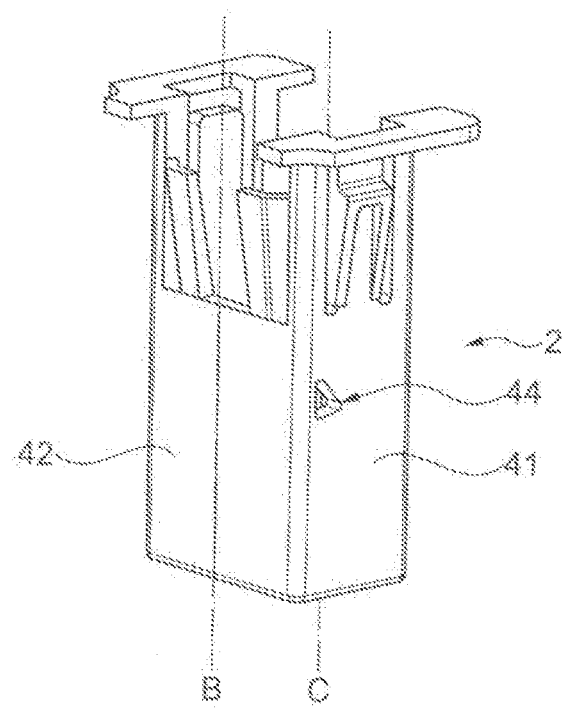

In another embodiment of the invention, shown in FIGS. 10 and 11, the hollow body 2 is formed by assembling first and second body portions 41 and 42. Thus, before being assembled, each portion of the hollow body 2 may be stored separately so as to limit storage volume, in particular during transport. The two portions 41 and 42 include a blocking and unblocking system so as to make it possible to assemble or disassemble the hollow body 2. The system includes centering pins 43 that are positioned on at least one of the two body portions 41, 42, and orifices, not shown, that are designed to receive the centering pins, which orifices are positioned on the opposite body portion, symmetrically relative to the centering pins 43.

The body portion 41 includes one of the two transverse walls 5, and a portion of each of the two side walls 4. The body portion 42 includes the other transverse wall 5, and a portion of each of the side walls 4, completing the portions of the body portion 41. The opposite side wall portions of the two body portions being symmetrical about axes B and C.

In this embodiment, the transverse wall 5 of the hollow body 2 includes a monitoring opening 44 from which it is possible to observe the flexible finger 23 deforming. The flexible finger 23 is separate from the central island 19 and is fastened against the side wall 4 without passing through the cam opening 18, not present in this embodiment. The finger is arranged in such a manner as to follow the extension of the sloping panel 20.

A gap d1 between the flexible finger 23 and the central island 19 makes it possible to move the cam finger 38 in the disengagement portion, along the side wall 4. The flexible finger is thus deformed by the stress exerted by the cam finger 38.

The invention makes it possible to achieve the above-mentioned objects. Specifically, it can be seen from the description that the article 100 is fastened on the support plate 200 by a first longitudinal thrust P1, and that separation can occur only after a first longitudinal removal force R1, followed by a second longitudinal thrust P2, and then by a second longitudinal removal force R2. Thus, any accidental removal is made impossible. Furthermore, when the fastening is subjected to an impact, the fastener device 1 passes from its first blocking position to the second blocking position in which the slider 3 is moved longitudinally relative to the hollow body 2. The position of the slider 3, extracted in part from the hollow body 2, thus indicates that the fastener device 1 has been subjected to an impact. Thus, the fastener device 1 may be replaced, repaired, or merely checked. As a result of the article 100 remaining attached to the support plate 200 after an impact, it is possible to avoid it becoming transformed into a dangerous projectile. The fastener device 1 of the invention thus presents two fastener systems, thus making it reliable in use.

Naturally, the present invention is not limited to the above description of an embodiment, and it may be subjected to various modifications without going beyond the ambit of the invention.

The invention claimed is:

1. A fastener device for fastening an article on a support plate, which fastener device comprises: a hollow body that is for housing in an engagement opening of said support plate, and that is provided with anchor means that are suitable for securing it to said support plate; a slider that is suitable for successively being engaged in and extracted from said hollow body, and that is provided with attachment means that are suitable for securing it to said article; and blocking means that are arranged:
   on application of a first longitudinal thrust on said slider, initially to allow said slider to be engaged longitudinally in said hollow body, and subsequently tending to hold said slider blocked longitudinally relative to said hollow body in a first blocking position in which it cannot be engaged longitudinally beyond said first blocking position; and
   on application of a first longitudinal removal force on said slider following said first longitudinal thrust, to retract in part and initially unblock said slider from said first blocking position and allow it to be removed in part from said hollow body starting from said first blocking position, and subsequently block said slider longitudinally in a second blocking position that is longitudinally offset from said first position and in which it cannot be removed from said hollow body and cannot be engaged longitudinally beyond said second blocking position;
   wherein said blocking means comprise both at least one side opening that passes through said hollow body and also an elastically-deformable blocking tab that is carried by said slider and that, during engagement of said slider in said hollow body, is for deploying sideways into said side opening and for bearing simultaneously beneath said support plate so as to oppose any longitudinal removal of said slider, and against said slider so as to oppose any longitudinal thrust of said slider, and thus define said first blocking position.

2. A fastener device according to claim 1, wherein said blocking means are arranged:
   on application of a second longitudinal thrust on said slider following said first longitudinal removal force, to retract in part and block said slider longitudinally relative to said hollow body in said first blocking position; and
   on application of a second longitudinal removal force thrust on said slider following said second longitudinal thrust, to retract completely so as to unblock said slider from said first position and allow it to be removed completely from said hollow body.

3. A fastener device according to claim 1, wherein said blocking means comprise a flexible tab provided at least with a cam finger and a cam, one of which is carried by said slider and the other by said hollow body, said cam including a central island that defines a guide path suitable for guiding said cam finger, and that is provided with an engagement portion for guiding said cam finger towards its first blocking position while said slider is being engaged in said hollow body, a disengagement portion for acting, while the slider is being removed, to guide said cam finger relative to said hollow body after said second blocking position, and a setback that separates said engagement and disengagement portions, and that is for receiving said cam finger and for defining said second blocking position.

4. A fastener device according to claim 3, wherein said cam includes a stop lug that is longitudinally offset from said central island and that is provided longitudinally facing said setback, and in that said slider is arranged so that, in said first blocking position, said cam finger is longitudinally facing said stop lug and is flattened by said flexible tab against said stop lug that prevents it from passing from said engagement portion to said disengagement portion, thereby defining a standby position for said cam finger.

5. A fastener device according to claim 4, wherein said central island includes a flexible finger that is arranged to prevent said cam finger from being inserted into said disengagement portion while said slider is being engaged in said hollow body, and to allow said cam finger to leave said disengagement portion while said slider is being removed from said hollow body.

6. A fastener device according to claim 3, wherein said flexible tab is carried by said slider, and in that said cam is carried by said hollow body.

7. A fastener device according to claim 3, wherein said flexible tab presents an upsidedown T-shape, in that the width of said stem of the T-shape is less than the width of said jaws, in that the bar of said T-shape forms the cam finger on either side of said stem of the T-shape, and in that said hollow body includes the two cams that are provided on either side of a mid-plane of said hollow body, symmetrically to each other about said mid-plane and each for receiving one of said cam fingers.

8. A fastener device according to claim 1, wherein said slider includes two flexible jaws that co-operate with each other to define a longitudinal recess for receiving said article and for blocking it between them by clamping, so as to form said attachment means.

9. A fastener device according to claim 8, wherein said slider is formed by folded sheet metal, in that each jaw presents an upsidedown U-shape, the ends of the facing inside branches of said jaws being interconnected via a base so as to co-operate with each other to define a U-shape that defines said longitudinal recess, and in that an outside branch of one of the jaws opposite to the other jaw is extended longitudinally by a plane portion forming said flexible tab.

10. A fastener device according to claim 9, wherein each free end of each outside branch of said upsidedown U-shape of each jaw includes a flap that is folded back towards the corresponding inside branch of said upsidedown U-shape, in that each free end of each inside branch of said upsidedown U-shape of each jaw includes a notch that houses said corresponding flap and that is arranged in such a manner that, while said slider is being subjected to said first or second longitudinal removal force, it receives thrust from said flap, so as to prevent said outside branches from unfolding relative to said inside branches.

11. A fastener device according to claim 9, wherein said slider includes at least one blocking strip that extends from said base defining said longitudinal recess, and that is arranged in such a manner that, while said slider is being subjected to said first or second longitudinal removal force, it bears against the free ends of said outside branches, so as to prevent said inside branches from unfolding relative to said outside branches.

12. A fastener device according to claim 1, wherein said hollow body includes at least one platform that extends sideways and that is for coming to bear against said support plate, and a flexible hook that is flexible sideways and that is suitable for retracting while said hollow body is passing into said engagement opening, and for deploying beneath said support plate when said platform bears against said support plate so as to block said support plate between said platform and said flexible hook and so as to form said anchor means.

13. A fastener device according to claim 1, wherein the hollow body comprises first and second body portions that are designed to be mounted on each other and to be taken apart.

14. An assembly of an article on a support plate that is provided with an engagement opening, the assembly comprising a fastener device according to claim 1, said hollow body being housed in said engagement opening and secured to said support plate by said anchor means, said article being secured to said slider by said attachment means.

* * * * *